United States Patent [19]
Hommes et al.

[11] Patent Number: 5,771,547
[45] Date of Patent: Jun. 30, 1998

[54] TENTER CLIP CLEANING METHOD AND APPARATUS

[75] Inventors: William John Hommes, Hockessin, Del.; Albert White Forrest, Jr., Chillicothe, Ohio; Paul G. Jennings, Middletown, Del.

[73] Assignee: E.I. du Pont de Nemours and Company, Wilmington, Del.

[21] Appl. No.: 911,120

[22] Filed: Aug. 14, 1997

[51] Int. Cl.[6] .................................................. D06C 3/04
[52] U.S. Cl. .............................. 26/93; 26/94; 264/288.4
[58] Field of Search ................................ 26/93, 94, 96, 26/89, 92, 73, 98, 52; 198/494, 495; 264/288.4, 289.3, 289.6, 290.2; 34/629, 638, 639, 658

[56] References Cited

U.S. PATENT DOCUMENTS

| 3,071,157 | 1/1963 | Robertson | 26/75 |
| 3,150,433 | 9/1964 | Kampf | 26/57 |
| 3,789,975 | 2/1974 | Ida et al. | 198/493 |
| 4,176,429 | 12/1979 | Rottensteiner | 26/93 |
| 5,072,495 | 12/1991 | Kautt | 29/33 K |
| 5,159,733 | 11/1992 | Fleming, Jr. et al. | 26/93 |
| 5,267,378 | 12/1993 | Wellenhofer | 26/93 |
| 5,373,613 | 12/1994 | Young et al. | 26/96 |

Primary Examiner—Amy B. Vanatta

[57] ABSTRACT

A method and apparatus is disclosed for ejecting a loose film edge from a film stretching clip by directing a jet of fluid such as air through a channel in the clip and between adjacent clips at or before release of a film from the clip and also after release of the film.

12 Claims, 3 Drawing Sheets

TENTER CLIP CLEANING METHOD AND APPARATUS

BACKGROUND OF THE INVENTION

The present invention relates to a method and apparatus for use in a tenter type stretcher for film to prevent torn-off edges of web or other debris from remaining in the web clamping clips. Such tenter-type stretchers may be those that stretch only in a lateral direction (known as a sequential stretcher), or may be those that stretch simultaneously in a lateral and longitudinal direction (known as a simultaneous stretcher). In the latter type of simultaneous stretcher, the clips holding the web along the lateral edges separate from one another as the web is stretched longitudinally. In some well known simultaneous stretchers, all clips may be driven longitudinally by cams and cam followers as in U.S. Pat. No. 3,150,433 (Kampf), or only some of the clips may be driven longitudinally with intermediate clips carried along by the web as in U.S. Pat. No. 5,072,495 (Hommes, et al.). Other types of simultaneous stretcher operation are also possible where the web is separately driven longitudinally and all clips are carried along by the web.

Tenter-type stretchers basically comprise a pair of opposed endless guide tracks disposed in spaced relation to one another. The spacing between the tracks increases from the entrance of the stretcher to the exit to stretch the web laterally. A plurality of clip carriages are propelled along the tracks and are adapted to engage and retain the edge of the web of material (hereinafter film) at the entrance of the stretcher. As the film travels from the entrance to the exit of the stretcher, the film is laterally stretched by the divergent orientation of the tracks. In the case of simultaneous stretchers, the film is also longitudinally stretched as the carriages are separated from one another and increase in speed as they proceed from the entrance to the exit of the stretcher. At the exit of the stretcher, the clips are activated, usually by mechanical or magnetic means, to release the film edge and return to the entrance end of the stretcher. At the entrance end, the clips are activated to a closed position and again engage the edge of the advancing unstretched film.

In the production of film, particularly films of polymeric, e.g. thermoplastic material, such as polyester film, it is often necessary or desirable for the stretching operation to occur at an elevated temperature. In these situations, the endless tracks are often routed through one or more heating zones to warm the film while it is being stretched.

A common problem in the production of film is that the film can tear, break, or stretch unevenly. Such problems can be caused by a number of factors, such as impurities in the film, defects due to poor film formation, and improper orientation of the tenter clips relative to the film. Another common cause of film breakage or improper stretching is due to obstructed clips which fail to properly engage or secure the film during the stretching operation. Such obstructions can result from torn remnants of film being lodged in the clip, accumulated deposits of oil and dirt, broken clips, etc.

When a problem of film tearing or breakage is detected, it is necessary to continue removing the edges of film from the clips even though the film tension, which is usually present to remove the edges from the clip, may be absent or diminished. If the film edges stick in the clips, the edges may tear and follow the clips on the return side of the track, or pieces of film may lodge in the clips and prevent proper gripping of the edges of the film at the entrance end of the stretcher. In either case, a shutdown of the stretcher would result which is highly undesirable. If the edges of film are properly removed from the clip during a tear, the stretcher may continue to run with the film going to waste until the tear can be healed and the full width of film restored. Manual removal of a film edge by an operator is undesirable and impractical due to the high speed of the stretcher that makes visual location of the waste difficult, and the safety hazard presented by reaching into the moving clips.

U.S. Pat. No. 3,789,975 to Ida et al. describes a device mounted on each clip for preventing the torn edge of film from being pushed to the back of the clip as the clip is disengaged from the film. Such a device does not actively remove a film edge or scraps of film from the clip. U.S. Pat. No. 4,176,429 to Rottensteiner describes a cleaning device to remove debris from a clip as it moves along the return travel of the clip chain. The device employs brushes to scrape off debris that has accumulated over time. It does not prevent a bead of film on an edge from being trapped in the clip on the film side of the stretcher. U.S. Pat. No. 5,159,733 to Fleming et al. describes a device to detect debris on a fully opened stretcher clip sending a warning to an operator to automatically shut down the stretcher or reduce speed to clean the clip. It does not attempt to remove the debris from the clip, especially on the film side of the machine where a torn edge may be present.

Attempts have been made to remove debris from the clips, just as the clips are opened by a turning wheel, as they leave the film side of the stretcher. A series of air jets are directed from the top of the clip downward through the clip body to blow debris out from behind the opened moveable clip arm as it passes the stationary jets. The jets are widely spaced (at a distance equal to the fixed clip spacing) at several locations along the path of the clip as the clips withdraw from the film side of the stretcher. It is believed that the downward direction of the air jet between clips is not effective for removing film edges extending from one clip to the next, and the dissipation of the force of the jet as it is redirected by surfaces on the clip body results in incomplete removal of debris from the clip.

There is a need for a clip cleaning device that is efficient in removing debris before it becomes a problem in the operation of the machine. There is a need for a clip cleaning device that will effectively remove large pieces of film edge to prevent it from wrapping from the film side to the return side of the stretcher. There is a need for a clip cleaning device that exerts a removing force on torn edge bead between clips that may be spaced apart as in a simultaneous bidirectional stretcher.

SUMMARY OF THE INVENTION

The invention is directed to a method of ejecting a loose film edge from a moving film stretching clip of a simultaneous stretching device for a planar sheet of film, comprising:

a) directing a jet of fluid at the edge of the film exposed between spaced clips and parallel to the plane of the film at a first position at or before release from the moving clip and at a second position after said release;

b) releasing the film from the clip, thereby allowing the jet of fluid to eject the loose film edge from the clip.

The invention is also directed to a method of ejecting a loose film edge from a moving film stretching clip of a sequential or simultaneous stretching device for a planar sheet of film, comprising:

a) directing a jet of fluid directly at the edge of the film and parallel to the plane of the film at a first position at or before release from the moving clip and at a second position after said release;

b) providing a channel on a body member on the moving clip, the channel aligned with a gripping support on the clip and aligned to receive said jet of fluid;

c) directing said jet of fluid through said channel on said clip;

d) releasing the film from the clip at the gripping support, thereby allowing the jet of fluid to eject the loose film edge from the clip.

The invention is also directed to apparatus in accomplishing the above methods.

DETAILED DESCRIPTION OF THE INVENTION

Figure 1:
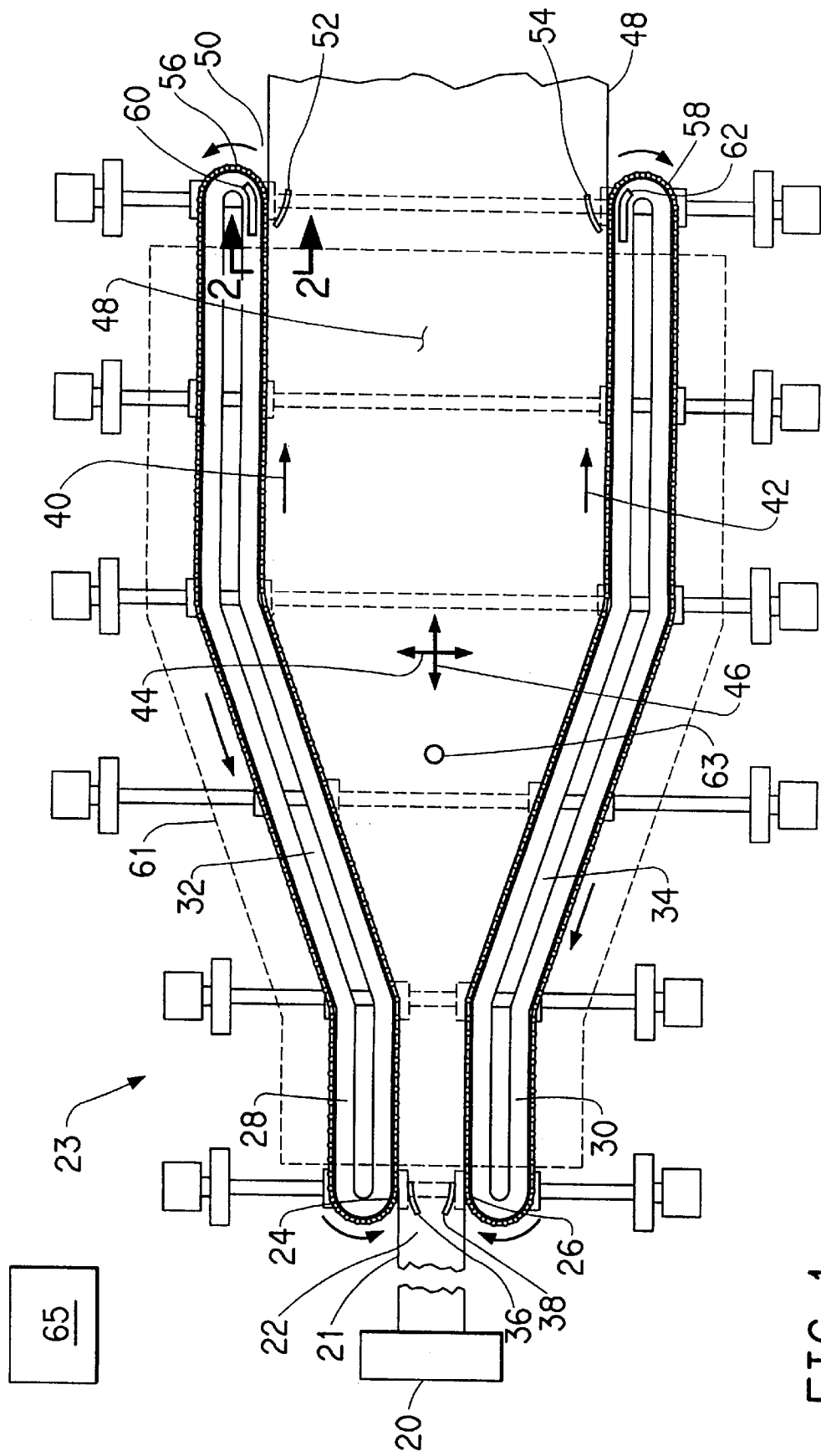
FIG. 1 is a plan schematic view of a tenter-type stretcher.

FIG. 1 shows a schematic plan view of a typical tenter-type stretcher for a web, such as a film. A polymer is cast onto a chilled roll at 20 to form a cast film 21 that is fed to the entrance 22 of the stretcher 23 where it is grasped by clips on carriages, such as carriages 24 and 26, riding on tracks, such as tracks 28 and 30, in opposed recirculating endless loops, 32 and 34. At the entrance end 22, there are cam surfaces 36 and 38 that act on a clip lever on each carriage to close the clips to grip the edge of the film. As the carriages proceed along the tracks in the direction of arrows 40 and 42, the film is stretched laterally in direction 44 and, in the case of a simultaneous stretcher, the film is stretched longitudinally in direction 46. Such a simultaneous-type stretcher is described in U.S. Pat. No. 5,072,493 to Hommes et al. The stretched film 48 then proceeds to the exit end 50 of the stretcher where there are cam surfaces 52 and 54 that act on the clip lever on each carriage to open the clips to release the edge of the film. The film is released before it reaches the end 50 of the stretcher. The stretched film 48 leaving the stretcher has tension applied by winding devices (not shown) that wind the film into rolls. This tension insures the film edges are pulled from the clips as the clips move away from the film at end turns 56 and 58 to return to the entrance end 22 of the stretcher. Near the exit end 50 of the stretcher, and located along a distance that spans the cam surfaces 52 and 54, are jet means 60 and 62 directed at the clips that act, during a film tear, to remove film edges and debris from the clips so no edge or debris is carried to the return side of the stretcher. It is important that the jets start at or before the point where the clip arm releases the film. At this point before release, the film is in a known location and has not had a chance to get entangled in any part of the clip. During a film tear, by having the jets on and acting on the film edges before they are released, the instant the torn film edge is released the air streams eject it from the clip to eliminate entanglement or entrapment in the moving parts of the machine. It is important to get the film debris out of the clips before they are retracted from the path of the edge of the film. If the film scrap is carried off the film path by the clip, large forces may be generated between the film and clip that make film removal by a jet of fluid difficult.

Frequently, there is an oven enclosure 61 (shown in dashed lines) surrounding a major portion of the stretcher 23 for heating the film as it is being stretched. There are a plurality of sensors, such as sensor 63, located in the oven and directed at the film to monitor film temperature for control purposes. In the case of film tears, the temperature sensed by the sensor 63 changes dramatically as the film moves away from the sensor, and this can be used to detect film tears in the stretcher. In this case, the sensor 63 also serves as a position detector to sense the presence of the planar film in the stretcher. A controller 65 is used to operate the stretcher and monitor the output from sensors, such as sensor 63.

Figure 2:
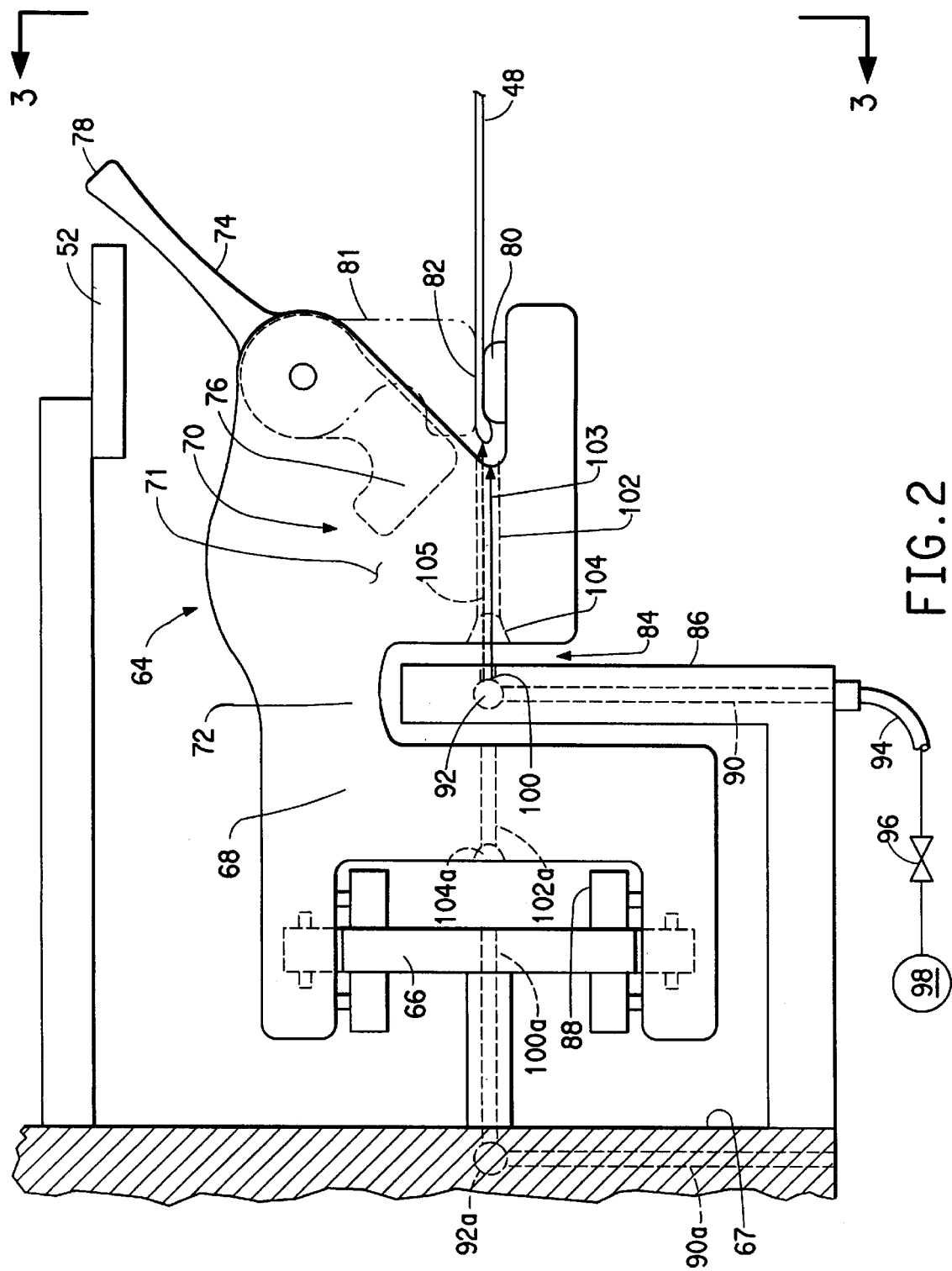
FIG. 2 is end view 2—2 from FIG. 1 showing a clip carriage.

FIG. 2 shows view 2—2 from FIG. 1 that is an end view of a clip carriage 64 supported by track section 66 mounted to frame 67. The clip carriage 64 comprises a track engaging portion 68, a film engaging portion 70, and a connecting portion 72. The film engaging portion comprises a clip arm 74 having a film gripping end 76 and a cam engaging end 78, and a film edge support 80 for supporting the film edge 82 which extends along the stretched film 48. When the cam engaging end 78 contacts the cam surface 52, the clip is forced to the open position as shown with the edge of the film released. Dashed lines 81 indicate the gripping end 76 in the gripping position, thereby gripping the film securely in the clip carriage. The clip 78 includes a suitable spring (not shown) for holding the gripping end in the open and gripping positions. Between the track engaging portion 68 and the film engaging portion 70 is a slot 84. Such a carriage and clip arrangement is described further in patent publication DE 4,436,676 to Steffi, filed Oct. 13, 1994 and published Apr. 18, 1996. Within this slot 84 is located a screening wall or shield 86 that protects the clip and film from lubricants and debris associated with the track and track engaging elements, such as bearing 88. Jet means, such as 60 and 62, comprises a length of shield 86 (for jet means 60) that has a plurality of closely spaced orifices connected to a source of pressurized fluid. For instance, in shield 86, there is a passage 90 in the shield that is connected to a plenum 92 extending along the shield, and a conduit 94. The conduit 94 is connected to a valve 96 and a source 98 of pressurized fluid which could be a fluid like air, nitrogen, water or carbon dioxide. Valve 96 is controlled by controller 65. The plenum 92 is in fluid communication with a plurality of orifices, such as orifice 100.

A suitable range of fluid pressure is from 10 to 80 psig with a preferred range of 20 to 60 psig. If the pressure is unduly high and the stretching line is narrow a film bead can be blown from a clip satisfactorily but can redeposit on another opposing clip.

The body 71 of film engaging portion 70 of carriage 64 also includes a passage 102 that has one end adjacent the film edge support 80 and the opposite end in fluid communication with opening 104. Opening 104 is aligned with the plurality of orifices, such as orifice 100, in shield 86. Opening 104 has a maximum size that is larger than the size of orifice 100 to facilitate the flow of fluid from orifice 100 to opening 104 and through passage 102. As the carriage passes in a path adjacent shield 86, as determined by track section 66, the pressurized fluid passing through orifices, such as 100, form jets of fluid leaving the orifices that are directed at the edge of film 82. If an orifice is uncovered by the moving clip carriage body 71, the jet of fluid passes directly to the edge of film as indicated by arrow 103. The flow path of the jet of fluid is parallel to the plane of the film and is preferably perpendicular to the edge of the film. Passage 102 is also generally parallel to the plane of the film and to the flow path of the fluid. If an orifice is aligned with opening 104 and passage 102 of the moving clip body 71, the jet of fluid passes directly through the passage and at the edge of film 82, as indicated by arrow 105.

In tenter type stretchers that do not have a shield, and/or may have different carriage designs, the jet means may comprise a stand-alone plenum with a plurality of orifices, such as orifices 100. The plenum would be positioned behind the clip carriage path to interact with other suitable openings, such as opening 104, and other suitable passages, such as passage 102, in the clip carriages. An equivalent to the plurality of orifices arranged in a row as shown would be a continuous slot or a plurality of tubes with aligned openings. An alternative to the holes in the shield will now be discussed referring to FIG. 2 and assuming the shield 86 is eliminated and the slot 84 is no longer needed, nor is connecting portion 72 on the clip carriage 64. In this case, the track engaging portion 68 and film engaging portion 70 would become a single body portion of carriage 64, and passage 102a and opening 104a would be located in this body portion. Orifices 100a would be located in track section 66, and plenum 92a and passage 90a would be located in frame 67. Conduit 94 would then be connected to passage 90a.

Figure 3:
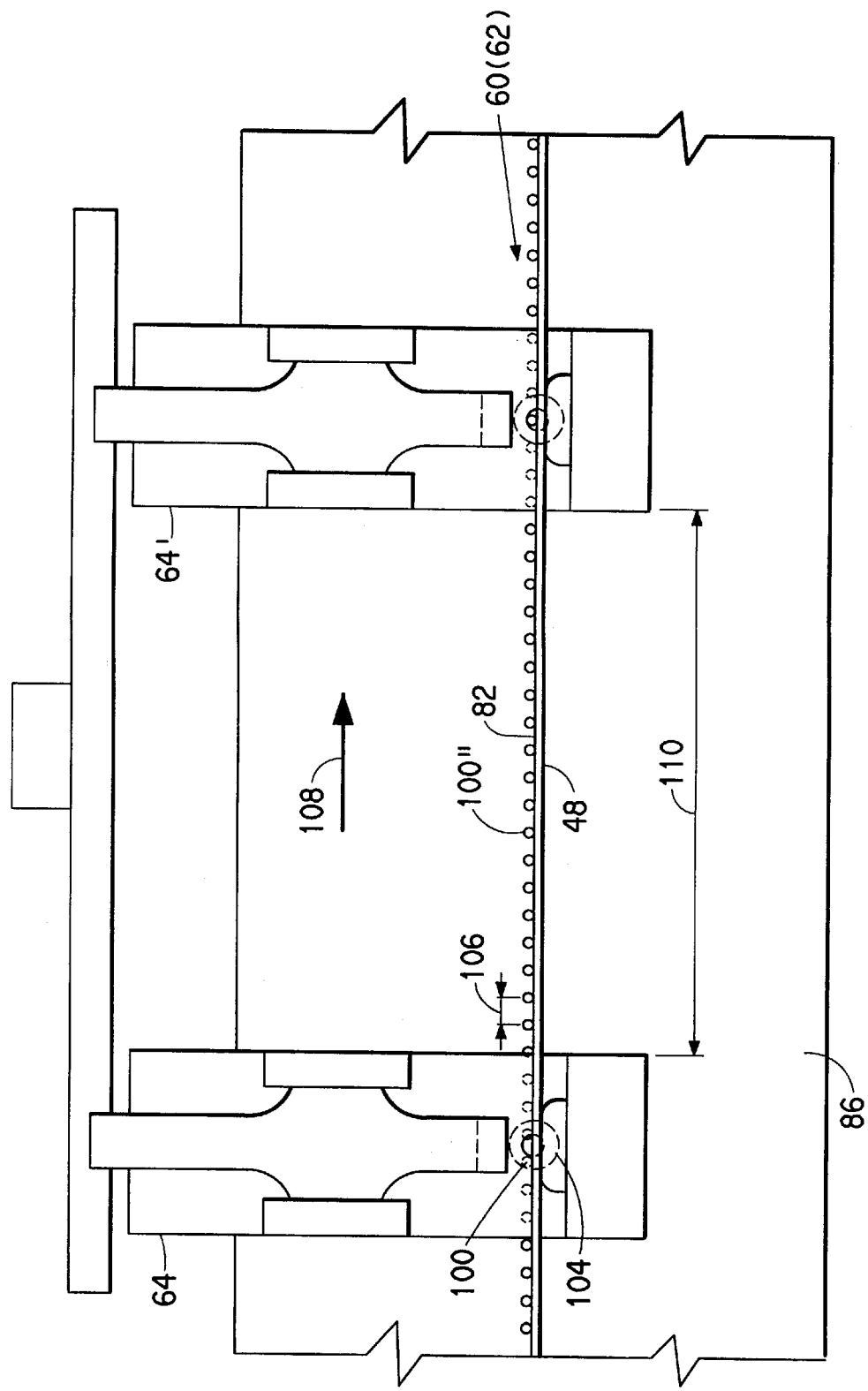
FIG. 3 is a side view 3—3 from FIG. 2 showing two clip carriages.

FIG. 3 is a side view 3—3 of FIG. 2 that shows two carriages 64 and 64' with the film 48 and film edge 82 extending between and beyond the clip carriages 64 and 64'. Shield 86 also extends between and beyond carriages 64 and 64', and orifices of jet means 60, such as orifice 100 are seen closely spaced along the portion of the shield illustrated in FIG. 1 as the location of the jet means 60. The invention is being described in relation to jet means 60, but jet means 62 is similarly configured to include orifices, such as 100' (not shown), in fluid communication with a control valve, such as 96' (now shown), and a source of pressurized fluid, such as source 98' (not shown). The orifices, such as 100, are closely spaced at a distance 106 so that there is always at least one orifice overlapping and in fluid communication with the opening 104 in carriage 64 or 64' as the carriages travel in direction 108 along shield 86 and past jet means 60. In space 110 between carriage 64 and 64', the orifices, such as orifice 100, are aligned with the film 48 and film edge 82. FIG. 3 shows the situation in a simultaneous stretcher where at the end of the stretcher the clips are spaced apart. In this situation, the passage 102 in the clips may be omitted and the jet of fluid is still effective in removing film debris from the clips since the jet can act on the film in the space between the clips. Performance and reliability of debris removal is improved, however, when the passage is present as shown. The passage 102 is necessary in a sequential stretcher (not shown) where there are no significant spaces between the clips and the jet of fluid can only reach the edge of film by passing through passage 102.

In operation, controller 65 monitors sensor 63 and controls the operation of stretcher 23 and valves 96 and 96'. During normal stretching of film in stretcher 23, valves 96 and 96' are closed so no pressurized fluid communicates with orifices, such as orifices 100 and 100' of jet means 60 and 62 respectively. If a film tear occurs, sensor 63 detects a change and that indicates a tear is present, and controller 65 commands valves 96 and 96' to open. Pressurized fluid, preferably compressed air at a source pressure of about 4 bar and 11 standard cubic-meters/minute (per plenum), then flows through plenums of jet means 60 and 62, such as plenum 92 of jet means 60, and through all orifices, such as orifice 100 of jet means 60 and orifice 100' of jet means 62. The fluid passing from the orifices is directed in a more or less straight path from the orifices of jet means 60 and 62 toward the center of the stretcher. The fluid passing from orifices aligned with openings, such as opening 104 in carriage 64, passes through the opening 104 and passage 102 and is directed at the support 80 and film edge 82 within carriage 64. This flow of fluid will force any torn edge of film or film debris out of the clip area of the carriage and toward the center of the stretcher away from the carriage and clip area. The fluid passing from the orifices not aligned with openings, such as opening 104, will pass around and past the carriage and will force any edge material between the carriages, such as space 110 between carriages 64 and 64', toward the center of the stretcher and away from the carriages and clip area. In the case of a simultaneous-type stretcher, there may be a large amount of fluid passing from orifices not aligned with openings in the carriages, since the carriages have become spaced apart during longitudinal stretching of the film. It is important that this fluid is directed toward the center of the stretcher and away from the carriages and clip area. It is important that the fluid jets are directed straight at the edge of the film and parallel to the plane of the film and aligned with passage 102 in clip carriage body 71 so the full force of the jets act to move the edge of the film toward the center of the stretcher and away from the moving clip carriage.

The valves 96 and 96' will remain open as long as the sensor indicates a tear is present, so torn film will be directed away from the carriages and clip area until the tear is eliminated. During this time, the stretcher can continue to run as efforts are directed to eliminating the tear. When the tear is eliminated, the sensor 63 will send a signal to the controller 65 indicating this, and the controller will command valves 96 and 96' to close, thereby stopping the flow of pressurized fluid to jet means 60 and 62. This will save in the unnecessary consumption of pressurized fluid.

EXAMPLE

The apparatus and method invention were evaluated in a simultaneous stretcher operated at a 4.2X MD stretch ratio, at a film stretching exit speed of 210 feet per minute, and using 20 psig air pressure to remove film debris from the stretching clips. On one side only of a stretcher without a shield, fifteen clips without slots were prepared with passage 102a as shown as an alternate embodiment of FIG. 2, and these were installed sequentially. The source of air pressure was attached to a section of track at the exit end 50 of the stretcher (FIG. 1) and the track was provided with passage 90a, plenum 92a and orifices 100a to form a jet means, such as 60 in FIG. 1. Orifices 100a were 1 mm diameter on 3 mm centers and were 76 mm from the film edge. A video camera was mounted looking at the jet means section to record the performance of the jet means and clips with and without the passage 102a. The air pressure to the jet means was controlled manually. To simulate a film break, the film on the side with the camera was notched with a knife at the entrance end 22 of the stretcher (FIG. 1.). On the side of the stretcher opposite the jet means, an operator manually removed any film debris. The evaluation was started by first turning on the air pressure to the jet means and then notching the film just as the clips with passages 102a were about to grasp the film at the entrance end so the notch would end up in the middle of the sequence of 15 modified clips. As the clips traveled through the stretcher and were spaced apart in the machine direction, the notch initiated a break. The jet means removed the debris on the one side and the operator removed debris on the opposite side until the break healed itself, which may take anywhere from a few seconds to several minutes, or until some of the film did not get removed from the clips and was carried around the end turn, such as 56 in FIG. 1. Three cases were considered during testing. These included the air jet used without the passage 102a, where air was blown on the film between clips; the case where the air jet and passages 102a are used together; and a control case where no air was provided to the jet. During the testing the video camera recorded the performance of the jet means with clips having passage 102a and with clips without passage 102a; and some of the time without the jet means. The tests were repeated many times. It was determined that the jet means removed the film debris most of the time from clips without passage 102a, but it removed the debris more reliably when the clips had a passage 102a. When the jet means was not used, the film debris wrapped around the end turn significantly more times than when the jet means was used.

What is claimed is:

1. A method of ejecting a loose film edge from a moving film stretching clip of a simultaneous biaxial stretching device for a planar sheet of film, where the clips separate during stretching comprising:

a) directing a jet of fluid at the edge of the film exposed between spaced clips and parallel to the plane of the film at a first position at or before release from the moving clip and at a second position after said release;

b) releasing the film from the clip, thereby allowing the jet of fluid to eject the loose film edge from the clip.

2. The method of claim 1, further comprising:

c) providing a channel on a body member on the moving clip, the channel aligned with a gripping support on the clip; and aligned to receive said jet of fluid; and wherein directing said jet of fluid includes directing the fluid through said channel on said clip.

3. A method of ejecting a loose film edge from a moving film stretching clip of a simultaneous or sequential stretching device for a planar sheet of film, comprising:

a) directing a jet of fluid directly at the edge of the film and parallel to the plane of the film at a first position at or before release from the moving clip and at a second position after said release;

b) providing a channel on a body member on the moving clip, the channel aligned with a gripping support on the clip and aligned to receive said jet of fluid;

c) directing said jet of fluid through said channel on said clip;

d) releasing the film from the clip at the gripping support, thereby allowing the jet of fluid to eject the loose film edge from the clip.

4. The method of claim 3, wherein directing the jet of fluid comprises directing the fluid through a plurality of closely spaced orifices aligned with the edge of film and extending from a point where the film is gripped by the clip to a point where the film is released.

5. The method of claim 3 further comprising:

(e) sensing the presence of the plane of film at a film stretching position within the stretching device and remote from said first and second positions, and disabling the directing of fluid;

(f) sensing the absence of the film and enabling the directing of fluid.

6. The method of claim 3 wherein the fluid is air.

7. An apparatus for ejecting loose film edges from a moving film stretching clip of a simultaneous biaxial film stretching device for a planar sheet of film, where the clips separate during stretching comprising:

a track member for guiding the plurality of film stretching clips along a path as each clip moves through a stretching device;

means adjacent said path of said plurality of clips for providing a flow of fluid along said path, said flow directed at the edge of the film and aligned parallel to the plane of the film;

a source of pressurized fluid in communication with said means for providing a flow of fluid.

8. An apparatus for ejecting loose film edges from a moving film stretching clip of a stretching device for a planar sheet of film, comprising:

a plurality of film stretching clips each having a passage extending straight through a body member and aligned with a film gripping support in said clip, the passage being parallel to the intended plane of a planar film gripped by each said clip;

a track member for guiding the plurality of film stretching clips along a path as each said clip moves through a stretching device;

means adjacent said path of said plurality of clips for providing a flow of fluid along said path and aligned with the passage in each clip;

a source of pressurized fluid in communication with said means for providing a flow of fluid.

9. The apparatus of claim 8, wherein said means to provide a flow of fluid comprises an elongated member positioned adjacent said path of said plurality of clips, said member having a fluid plenum in communication with a plurality of closely spaced orifices arranged in a line along said path.

10. The apparatus of claim 9, wherein said elongated member is said track member.

11. The apparatus of claim 9, wherein said clips are provided with a slot adjacent said passage, and said elongated member is a shield member positioned to extend into the slot in each of said plurality of clips.

12. The method of claim 3, wherein directing the jet of fluid comprises directing the fluid through a plurality of closely spaced orifices aligned with the edge of film and extending from a point where the film is gripped by the clip to a point where the clip releases the film and is retracted from a path of the edge of the film.

* * * * *